United States Patent [19]

Chambers

[11] Patent Number: 5,136,550
[45] Date of Patent: Aug. 4, 1992

[54] METHOD FOR ESTIMATING THE RESIDUAL SOURCE OF RECEIVER COORDINATES FROM CMP GATHERS

[75] Inventor: Ronald E. Chambers, Houston, Tex.

[73] Assignee: Western Atlas International, Inc., Houston, Tex.

[21] Appl. No.: 841,347

[22] Filed: Feb. 25, 1992

[51] Int. Cl.$^5$ .............................................. G01V 1/36
[52] U.S. Cl. ........................................ 367/38; 367/40
[58] Field of Search ..................... 367/38, 40, 50, 52, 367/19

[56] References Cited

U.S. PATENT DOCUMENTS

| | | | |
|---|---|---|---|
| 4,446,538 | 5/1984 | Zachariadis | 367/19 |
| 4,577,298 | 3/1986 | Hinckley | 367/50 |
| 4,613,960 | 9/1986 | Hinckley et al. | 367/51 |
| 4,641,287 | 2/1987 | Neeley | 367/19 |

OTHER PUBLICATIONS

Genrich, J. F. and Minster, J. B., Ship Navigation for Geophysical Application Using Kalman-filtered GPS Fixes, Geophysics, vol. 56, No. 12, Dec. 1991.
Encyclopedia Dictionary of Exploration Geophysics, pp. 316-319.

Primary Examiner—Ian J. Lobo
Attorney, Agent, or Firm—William A. Knox

[57] ABSTRACT

This is a method for optimizing the coordinates of transducer stations involved in a common mid point gather. Relative reflection-data misalignments between the traces of the gather are attributed to errors in the reported offsets between transducers. Each trace of the gather is iteratively cross-correlated with a pilot trace, using a different offset increment for each iteration. The offset increment that maximizes the correlation coefficient is accepted as the most likely offset residual appropriate to the trace in question. The offset residual is applied to the nominal offset to provide a range measurement vector. The intersection of the range measurement vectors from a plurality of interdependent common mid-point gathers is the best estimate of the transducer location.

5 Claims, 3 Drawing Sheets

METHOD FOR ESTIMATING THE RESIDUAL SOURCE OF RECEIVER COORDINATES FROM CMP GATHERS

BACKGROUND OF THE INVENTION

1. Field of the Invention This invention provides a method for using seismic reflection data to estimate residual receiver coordinates using reflection-data misalignments between traces observed in a CMP gather.

2. Discussion of the Prior Art

In the art of seismic surveying, a plurality of seismic receiver transducers, coupled to a signal-transmission cable, are distributed within an area of survey at prescribed intervals at or near the surface of the earth. Typically, the survey area may be divided into a (preferably) uniform grid, measuring, perhaps, 25 to 50 meters per side. The receiver transducers may preferably be located at the grid intersections. At designated stations or shot points, an energy source transducer fires a shot to generate a wavefield in the subsurface earth layers. The wavefield is reflected from the respective strata in the earth, ultimately returning to the surface. The receivers on the surface detect the reflected seismic waves, convert the mechanical seismic waves to electrical signals and transmit the resulting electrical signals through the cable to a recording device. The electrical signals are preferably recorded on a suitable recording medium for archival storage and later analysis.

Throughout the remainder of this disclosure, the term "transducer" is a collective term that includes both acoustic-signal receivers and acoustic energy sources. A transducer-specific qualifier will be used only when needed for clarity of context. If used, the transducer-specific terms will be limited to "source" or "receiver".

The recording device is usually a multi-channel data recorder. It is customary to couple the output from one or more receivers into each data channel. Several tens to several hundred data channels may be recorded from a single shot. The seismic signals flowing through the respective data channels are usually digitized and recorded on the recording medium in time-division multiplexed format as time scale recordings. The recording medium may be magnetic tape, a hard or floppy disk drive, a computer memory, optical disk or any other device now known or yet to be discovered.

The area to be surveyed is laid out with great care by a surveying crew, using methods suitable to the environment. At sea, various forms of radio ranging and/or satellite positioning are used. On land, transducer locations are referenced to geodetic bench marks, sometimes in combination with satellite positions. Despite the good intentions of the surveyors, the receiver emplacement engineers or the operators of the energy source may not be able to set up their instruments in the places originally designated. And even if they do, particularly at sea, ocean currents often cause some of the transducers to drift from their initial assigned locations.

Successful processing of the received seismic signals requires accurate knowledge of the relative configuration of the transducers as that configuration actually existed at the time of data recording. Various methods have been used in shallow-water marine operations for defining approximately-known receiver positions with respect to a known source position.

In U.S. Pat. No. 4,446,528 for a marine exploration system, a ship measures the water depth to the sensors mounted in a seismic bottom-cable as the ship passes over the cable. Next, the ship interrogates the sensors in the cable by means of sonar pulses along a slant range as the ship travels along a parallel, horizontally-offset path relative to the cable. The sensor locations are measured from recordings of the measured water depths combined with the slant-range travel times.

In another marine method, disclosed in U.S. Pat. No. 4,641,287, a series of seismic interrogation pulses are fired from different locations by an energy source. The distances from the shot locations to a sensor are determined by defining spherical surfaces upon which the sensor must be located. The intersection of several spherical surfaces derived from a plurality of shots determines the exact location of the sensor. Depth detectors may be used to eliminate one half of the possible locations for each shot.

The above two references are typical of known methods for use at sea but they are not of use for land operations. Another of the problems with the above references is that they assume that the interrogation signals are clean Dirac functions. That assumption is unrealistic because ambient noise severely degrades the interrogation signal, making it unreliable for precision use. Furthermore, special field operations and specialized field equipment are required, resulting in extra expense for the survey.

Copending U.S. patent application, Ser. No. 07/775,112, assigned to the assignee of this invention, teaches a statistical method for estimating the relative separation between a source and a receiver by use of the signature of the wavetrain that traveled along a substantially direct path between source and receiver. This process has the advantage of being useful on land as well as at sea and does not require special field equipment or operations. However, it does require additional special data-processing methods in the laboratory that are separate from conventional data-reduction routines.

In this disclosure, a method is taught in which the residual transducer coordinate errors can be estimated directly from information gathered during routine CMP data processing:

SUMMARY OF THE INVENTION

Disclosed is a method for using seismic reflection data to optimize the spatial coordinates of an array of seismic transducers that are mutually spaced apart by nominal offsets. The seismic reflection data are formatted as a plurality of discrete time series. Each discrete time series represents the time of propagation of a wavefield from a source to a receiver along an angular travel path after reflection from subsurface earth layers. Those time series whose angular travel paths impinge upon a common mid point are assembled into a common mid point gather. Using a known velocity field, the respective angular travel paths are collapsed to zero-offset. At least one of the discrete time series is designated as a pilot trace; the remainder of the discrete time series are designated as test traces. One of the test traces is iteratively cross-correlated with the pilot trace over a preselected range of offset increments. The offset increment that maximizes the correlation coefficient is accepted as an estimate of the offset residual attributable to that test trace. The offset residual is applied to the nominal offset to provide a range measurement vector for that test trace. The above steps are repeated for all of the remaining test traces.

In an aspect of this invention, the discrete time series are mapped from the time domain to the space domain prior to the step of cross-correlation.

In another aspect of this invention, the range measurement vectors from a plurality of interdependent common mid point gathers are recursively filtered to optimize the transducer station coordinates within an area of survey.

In another aspect of this invention, the pilot trace is formed by stacking all of the traces of the common mid point gather.

BRIEF DESCRIPTION OF THE DRAWINGS

These and other benefits of this invention will be better understood by reference to the appended detailed description and the drawings wherein.

DETAILED DESCRIPTION OF THE PREFERRED EMBODIMENT

Figure 1:
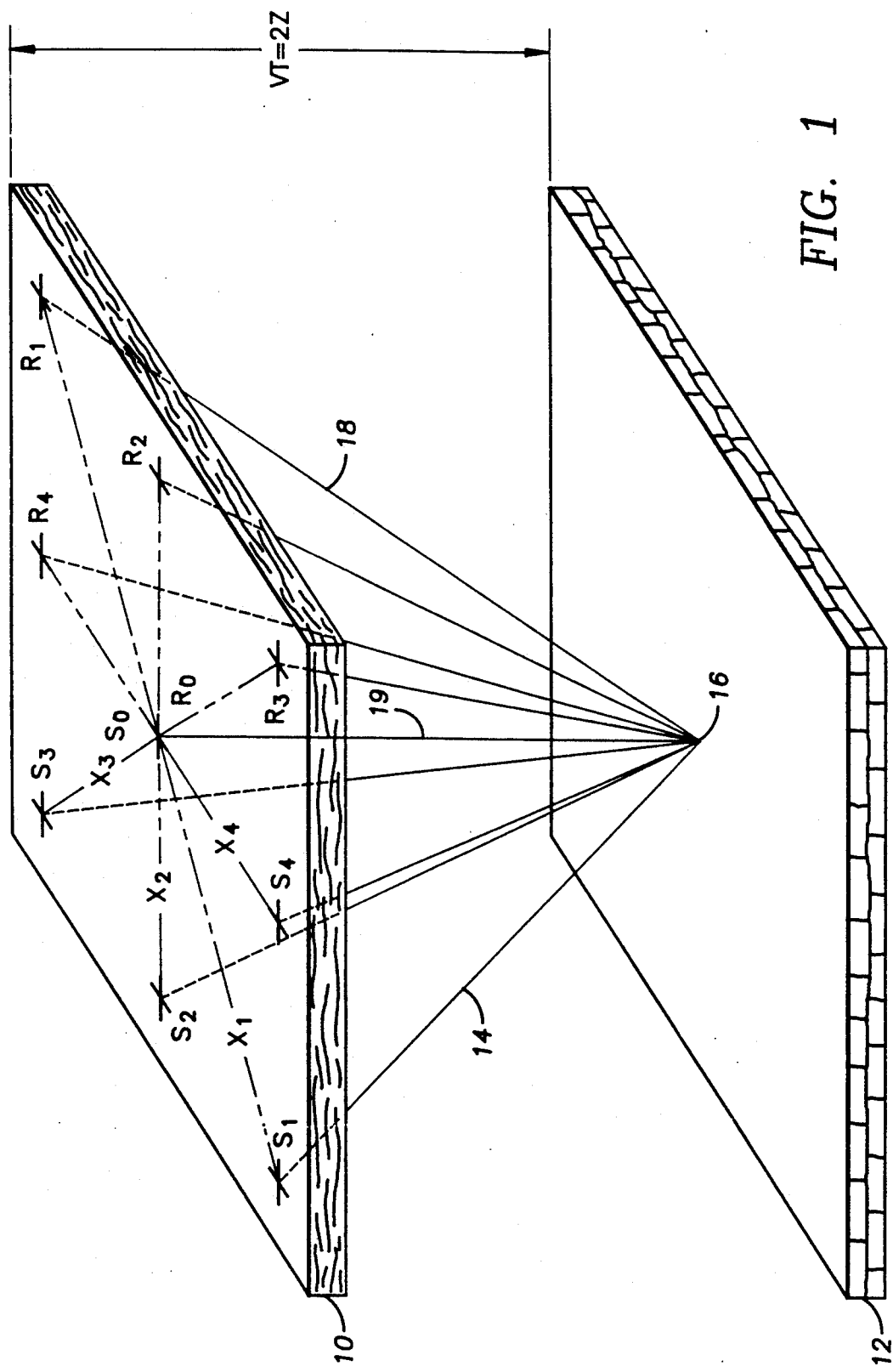
FIG. 1 is an isometric view of a 3-D CMP gather.

FIG. 1 is an isometric view of a selected block of transducer arrays that might be involved in a 3-D CMP gather. In real life, of course, many hundreds to many thousands of such transducers would be distributed over an area to be surveyed.

FIG. 1 represents a cube of the earth from a surface layer 10, which may be a water layer, to a selected stratum 12. Intervening earth layers are not shown to avoid complicating the drawing. For purposes of this example, the subsurface material of the earth is assumed to be homogeneous and isotropic. By way of example but not by way of limitation, five acoustic sources $S_0$–$S_4$ and five acoustic receivers $R_0$–$R_4$ are shown emplaced at or near the surface of earth layer 10. For purposes of this disclosure, the source positions are considered to be known accurately; the receiver positions are "nominal". That is, their locations are approximate. The opposite condition could also exist.

In operation, when an acoustic energy source is fired at $S_1$, the resulting wavefield travels downwards along ray path 14, is reflected from subsurface common midpoint 16, and returns to the surface along angular ray path 18, where it is detected by receiver $R_1$. The lateral distance between $S_1$ and $R_1$ is the offset, $X_1$. Similar ray-path geometries may be drawn for the other three source-receiver arrays. Source $S_0$ and receiver $R_0$ are shown as being co-located; that is, the offset is zero. The sources and receivers may be interchanged during the progress of the survey so that there can be a total of nine angular ray-path combinations whose apices will impinge upon a common midpoint (CMP) 16 to form the elements of a CMP gather. Of course a myriad of other common midpoints will exist for other transducer array combinations.

With respect to location $S_0,R_0$, the vertical two-way wavefield travel time $T_0$, along vertical travel path 19 from the source $S_0$ to layer 12 and back to the receiver $R_0$, multiplied by the average formation velocity V, is equal to twice the depth Z, from the surface 10 to layer 12. The wavefield travel time $T_r$, along an angular path from a source such as $S_1$ to a receiver $R_1$ is greater than $T_0$ by an amount $\Delta t$ because of the offset $X_1$. Assuming straight-path geometry, the time difference or normal moveout $\Delta t$ is equal to $$\Delta t = T_0 \{(1+X^2/V^2T_0^2)^{\frac{1}{2}} - 1\}$$

as is well known to the art. Since the average velocity usually increases with increasing reflection time, it is evident that, for a given offset X, the normal moveout $\Delta t$, decreases with increasing reflection travel time $T_0$.

The stacking velocity, V, for use in data processing is determined from a velocity analysis of any well-known type using reflection data gathered from within the area of survey. See for example, *Encyclopedia Dictionary of Exploration Geophysics*, by R. E. Sheriff, 1991 edition, pages 316–319.

The ultimate goal of data processing is to collapse the angular travel-time paths of a CMP gather, such as 14-16-18 (FIG. 1), to a zero-offset travel path such as 19. To that end, normal moveout (NMO) is applied to each trace of a multi-channel time scale recording in proportion to the reported (nominal) offsets of the traces in question, using the stacking velocity field as discussed above. If significant dip is present, a correction therefor (DMO) must be made. After application of NMO, those traces whose travel-time paths impinge upon a reflector at a common mid point, such as 16, FIG. 1, are stacked or combined as a CMP gather to form a single depth point. If the reported offset distances are in error, the applied NMO will be in error as previously discussed.

Figure 2:
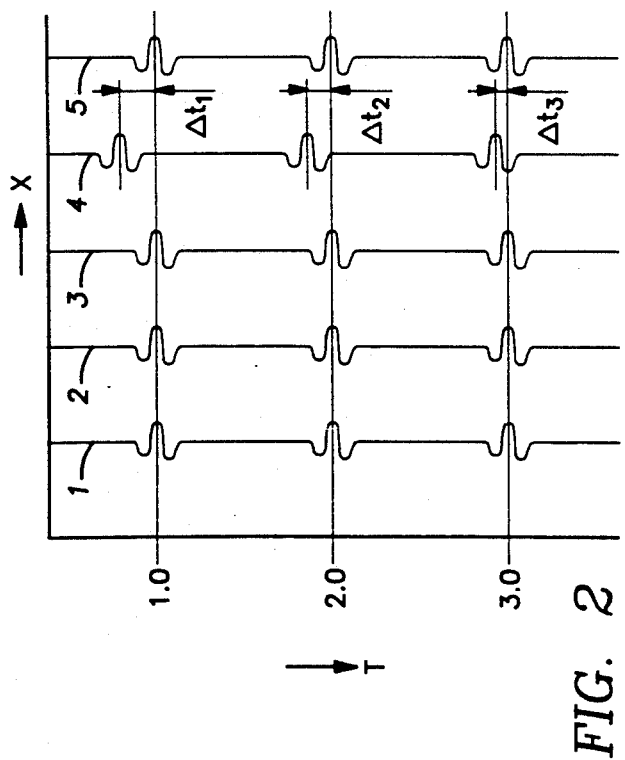
FIG. 2 illustrates the respective dynamic time delays associated with three wavelets having different travel times due to an offset error.
Figure 3:
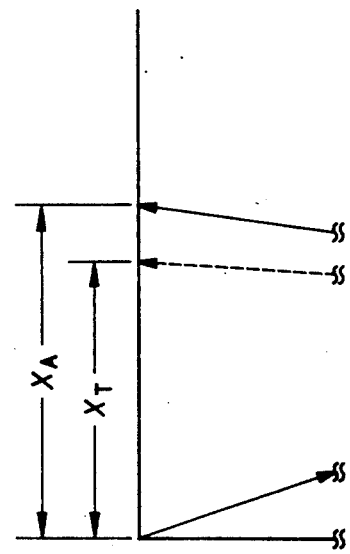
FIG. 3 is an explanation of the dynamic time delay due to a residual offset error.

Refer now to FIG. 2 which represents five analog time-scale seismic traces, 1–5, of a CMP gather after application of NMO but before stacking. The vertical scale is marked in terms of two-way travel time $T_0$. The horizontal scale is shown in terms of the offset distance, X. The peaks of the wavelets at 1.0, 2.0, and 3.0 seconds for traces 1,2,3 and 5 are aligned in time but the peaks for trace 4 are misaligned, with respect to the other four traces, to earlier times. Observe that the time displacements $\Delta t_1$, $\Delta t_2$ and $\Delta t_3$ on trace 4 for the three wavelets, diminish with increasing travel time as predicted by the NMO formulation for $\Delta t$ given earlier. The time misalignment is attributed to an assumed offset $X_a$ being much larger than the true offset $X_t$ as shown in FIG. 3. Too much NMO was applied because of the residual offset error which is defined as the difference between the true offset and the reported or nominal offset.

Figure 4:
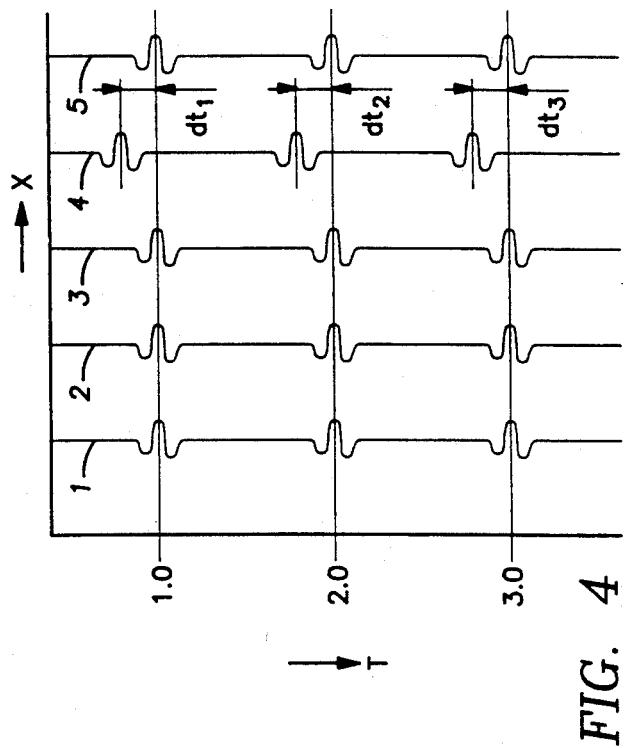
FIG. 4 illustrates the static time delays that might be associated with three wavelets due to an irregular LVL.
Figure 5:
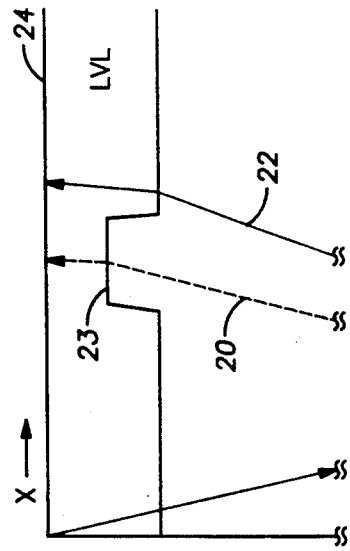
FIG. 5 illustrates the cause of a static time delay.

It is important not to confuse a trace displacement due to an incorrect offset with a trace displacement due to an incorrect static correction. Refer to FIGS. 4 and 5. In FIG. 4, the time displacements $dt_1$, $dt_2$, $dt_3$, for trace 4 relative to the other traces, are constant with increasing reflection time. In FIG. 5, the culprit is seen to be a low velocity layer (LVL), the base of which thinned abruptly at 23, just beneath the surface 24, between ray paths 20 and 22, corresponding to traces 4 and 5.

The residual offset correction can be estimated by a computer-aided cross-correlation process. The seismic reflection data are CMP sorted, NMO is applied to provide zero-offset data and the traces are stacked to form a pilot trace. Alternatively, any single trace could be chosen as a pilot trace. The traces of the CMP gather are assumed to have been digitized at some sample interval such as 2 milliseconds (ms) as discrete time series. The respective NMO-corrected traces in the gather, which are hereinafter termed test traces, are individually cross-correlated with the pilot trace in accordance with:

$$\phi_{GH}(\tau) = \lim_{n \to \infty} \frac{\sum_{k=-n}^{k=n} G_{g(k)}^2 \cdot H_{h(k)}^2}{\left( \sum_{k=-n}^{k=n} G_{g(k)}^2 \cdot \sum_{k=-n}^{k=n} H_{h(k)}^2 \right)^{\frac{1}{2}}}$$

where $\phi_{GH}(\tau)$ = correlation coefficient in terms of sample-interval shift;
$-n, n$ = correlation time limits;
$k$ = sample number;
$G$ = discrete time series, pilot trace;
$H$ = discrete time series, test trace;
$g(k) = k$;
$h(k) = k + \tau$;
$\tau$ = cross-correlation time lag.

In one preferred method of operation, the discrete time series representing the pilot and test traces are stretched from their normal time axis, $T_0$, to a $V^2T_0^2$ axis prior to cross-correlation. In effect that is a mapping function from the time domain to the space domain in accordance with the formulation $$X^2 = V^2T_0^2 - 4Z^2.$$

Since the reflection wavelets on the pilot trace and the test trace have a common depth, Z, that parameter drops out. V is assumed to be a known function of units of length per sample interval. Therefore, the only variable is the offset, X. Since the traces have been mapped to the space domain, we substitute the sample interval λ in the space domain for τ in the time domain. Thus, if $$g(k) = \lambda,$$

then $$h(k) = \lambda + dX.$$

We now separately cross-correlate the pilot trace and each of the test traces iteratively over increments, dX, of X. The cumulative range of X-increments would not exceed the separation spanning the original offset. The value of dX that maximizes the cross-correlation coefficient between the pilot trace and the test trace in question is an estimate of the offset residual for that test trace.

The above method involves mapping the time-scale traces to the space domain prior to cross-correlation. In an alternate, equally preferred method that may in some cases be a bit more economical of computer time, the pilot and test traces remain in the time domain. The traces are cross-correlated but with the following changes in the running indices:

$$g(k) = (k^2 + X_0^2/V_k^2)^{\frac{1}{2}}$$

$$h(k) = (k^2 + dX^2/V_k^2)^{\frac{1}{2}},$$

where $X_0$ may be zero for a zero-offset pilot trace and dX is, as before, an incremental value for X spanning the original offset. In the alternative method, the stretching process is incorporated within the framework of the cross-correlation process itself thus saving one processing step. Otherwise, the two methods Yield the same results and are equally preferable.

The offset residuals computed for the respective test traces are applied to the nominal offsets, entered into the trace header information and into a data base that defines the transducer coordinates, station identifiers and other pertinent information.

Any one transducer station usually is associated with more than one CMP gather; that is, the transducers in the survey area are involved in an interlaced network of seismic reflection raypaths. Therefore many independently-estimated offset residuals are available for use in refining the coordinates of any given transducer station under consideration.

Figure 6:
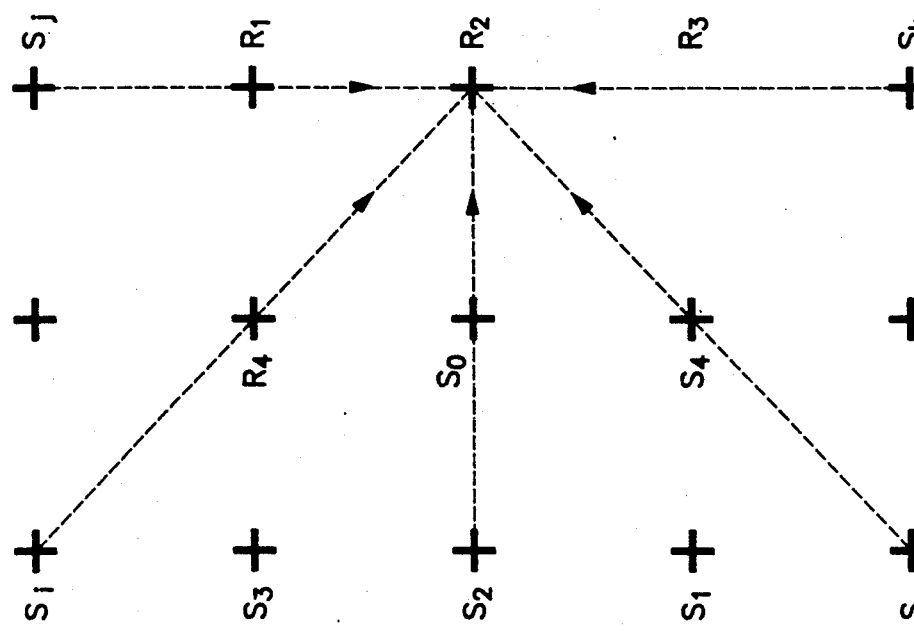
FIG. 6 illustrates a plurality of interdependent common mid points.

Refer now to FIG. 6 which is a plan view of the transducer stations of FIG. 1 but extended by one row of transducer stations in each direction along a line of survey. The Figure represents a transducer grouping having a plurality of interdependent common mid points. In addition to insonification by source transducer $S_2$, transducer $R_2$ might receive reflected wavefields from $S_i$, $S_j$, $S_k$ and $S_m$ over travel paths having common midpoints at $R_4$, $S_4$, $R_1$ and $R_3$. Each of the separate travel paths is capable of providing an independent offset residual estimate.

In operation, preferably the offset residuals from the various CMP gathers within the survey area are entered as range statistics into any well-known recursive spatial filtering routine. The offset residuals are applied to the nominal offsets to provide range measurement vectors. Input data to the filter are: Known and assumed (nominal) locations for the respective transducers, computed offset residuals (range measurements vectors) and range variances (correlation coefficients). The function of the filter is re-locate the nominally-positioned transducers with respect to transducers having known locations such that the residuals are minimized. The offset residuals are, in effect, perturbations to the state vector.

The quality factor of the range measurements depends upon the level of noise embedded in the seismic reflection data and upon the relative horizontal azimuths between vectors coupling the transducers.

Figure 7:
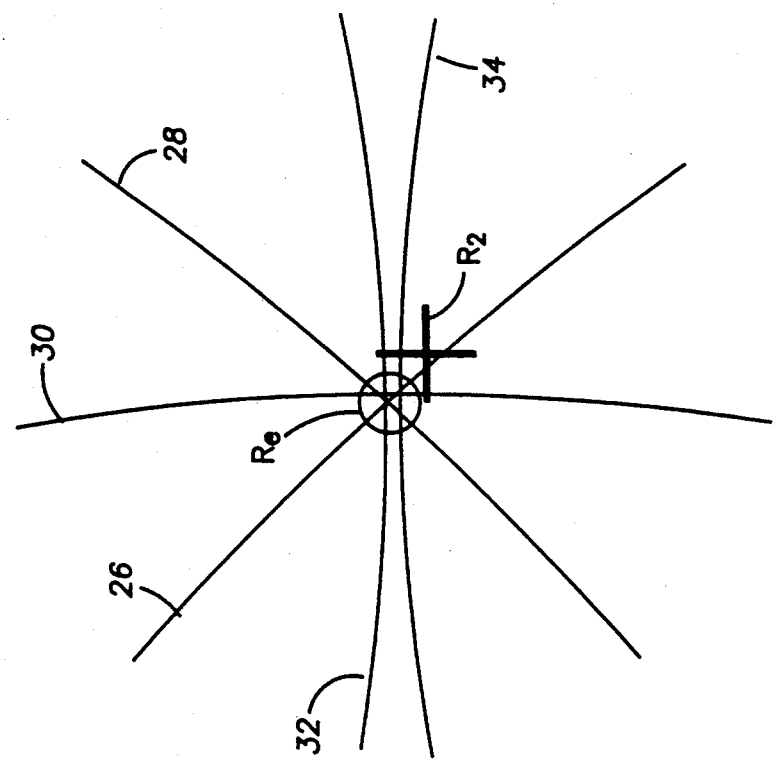
FIG. 7 illustrates relocation of a transducer position based upon minimizing the residual offsets.

The operation of the filter is best understood by reference to FIG. 7. The cross represents the nominal position of $R_2$ whose best-estimated true position is to be determined from the range measurement vectors obtained from FIG. 6. It is assumed that the source positions are known accurately. Line 26 is a line of position (LOP) drawn perpendicular to range measurement vector $S_m$-$R_2$ at a range determined from the offset residual computed from a CMP gather at $S_4$. Line 28 is an LOP derived from $S_i$; line 30 from $S_2$ and so on for lines 32 and 34. The best estimate $R_E$ of the true position of the receiver transducer is indicated by the circle at the intersection of the LOPs where the residuals between vectors are minimal. It is evident from the drawing that a fix taken from LOPs intersecting at right angles will be characterized by a superior quality factor as compared to fixes derived from LOPs that intersect at lesser angles.

Any well-known recursive spatial filter may be used. By way of example but not by way of limitation, a Kalman filter might be appropriate. One such filter routine designed for use in geophysical surveying is described in *Ship Navigation for Geophysical Applications*

*Using Kalman-filtered GPS Measurements* by J. F. Genrich et al., Geophysics, v. 56, n. 12, Dec., 1991.

The method of this disclosure is particularly applicable to geologic sections wherein the velocity field as a function of depth is relatively low and wherein the offsets are relatively large. The residual-offset-resolution of this technique depends on the sample interval; that is, the rate of change of moveout per unit of offset increment must equal to or exceed one sample interval.

The cross-correlation process can distinguish between trace misalignments due to an offset residual (FIG. 2) and a trace misalignment due to a static disturbance (FIG. 4). In the former case, the correlation coefficient $\phi(\tau)$ converges to some maximum value as the process iterates over increments of X. In the latter case, the process would be indeterminate. That is true because of the dependence of moveout differential with respect to reflection travel time: A trace wherein the wavelets exhibit a constant time shift at all reflection times would not match a trace wherein the time shift varies with travel time.

No doubt others skilled in the art will consider variations in the methods of this disclosure but which will fall within the scope and spirit of the invention which is limited only by the appended claims.

What is claimed is:

1. A method for using seismic reflection data to optimize the spatial coordinates of a plurality of seismic transducers, said seismic transducers being mutually spaced apart by nominal offsets, said seismic reflection data being formatted as a plurality of discrete time series, each said time series representing the propagation time of a wavefield from a source transducer to a receiver transducer along an angular travel-time path after reflection from subsurface earth layers, comprising:

a. assembling into a common mid-point gather, those discrete time series whose angular travel-time paths impinge upon a common mid point;
 b. collapsing the respective angular travel-time paths to zero offset using a known velocity field and said nominal offsets;
 c. designating at least one of said discrete time series as a pilot trace, the remaining time series being designated as test traces;
 d. iteratively cross-correlating a test trace with the pilot trace over a preselected range of offset increments;
 e. accepting, as an estimate of the offset residual attributable to that test trace, the offset increment that maximizes a correlation coefficient;
 f. applying said offset increment to the nominal offset associated with said test trace to provide a range measurement vector; and
 g. repeating steps d. through f. for the remaining test traces thereby to provide range measurement vectors for said remaining test traces.

2. The method as defined by claim 1, comprising the further step of:
 mapping said discrete time series from the time domain to the space domain prior to the step of iteratively cross-correlating a test trace with the pilot trace.

3. The method as defined by claims 1 or 2 wherein the preselected range of offset increments is equal to or less than the original nominal offset.

4. The method as defined by claim 3, comprising:
 forming a pilot trace by stacking the test traces that make up the common midpoint gather.

5. The method as defined by claim 3, comprising:
 recursively filtering the range measurement vectors derived from a plurality of interdependent common mid point gathers to optimize the transducer station coordinates within an area of survey.

* * * * *